United States Patent [19]

Rasca

[11] Patent Number: 4,572,465

[45] Date of Patent: Feb. 25, 1986

[54] DEVICE FOR INSTALLING AUTOMOBILE RADIOS ON AUTOMOBILE DASH PANELS BY FRONTAL APPLICATION AND WITHOUT THE USE OF SCREWS

[75] Inventor: Luigi Rasca, Trezzano sul Naviglio, Italy

[73] Assignee: Silem s.r.l., Milan, Italy

[21] Appl. No.: 606,524

[22] Filed: May 3, 1984

[30] Foreign Application Priority Data

Nov. 18, 1983 [IT] Italy ................................ 23782 A/83

[51] Int. Cl.$^4$ ............................................. G12B 9/00
[52] U.S. Cl. ................................... 248/27.1; 174/58; 248/DIG. 6
[58] Field of Search ............. 248/27.1, 27.3, DIG. 6, 248/205.1; 174/50, 58; 200/296; 220/3.6, 3.3, 3.5; 339/122 R, 125 R, 45 M

[56] References Cited

U.S. PATENT DOCUMENTS

| | | | |
|---|---|---|---|
| 3,480,344 | 11/1969 | Goodridge | 220/3.6 X |
| 3,589,656 | 6/1971 | Protzmann | 248/27.1 |
| 3,710,972 | 1/1973 | Barry | 174/58 X |
| 3,746,931 | 7/1973 | Muranaka | 248/27.1 X |
| 3,935,637 | 2/1976 | Bunnell | 248/27.1 X |
| 4,053,082 | 10/1977 | Ullman | 248/DIG. 6 |
| 4,313,150 | 1/1982 | Chu | 339/45 M X |

*Primary Examiner*—J. Franklin Foss
*Attorney, Agent, or Firm*—Stevens, Davis, Miller & Mosher

[57] ABSTRACT

A device for installing automobile radios includes a fixed support box for insertion into an aperture in the automobile front panel. The fixed support box is fixed in the front panel by means of a stop ledge and dogs which press against the panel. Locking elements are provided for locking the radio into the fixed support box and releasing it therefrom. The locking elements are controlled by moving a mobile handle fitted to the casing of the radio.

9 Claims, 20 Drawing Figures

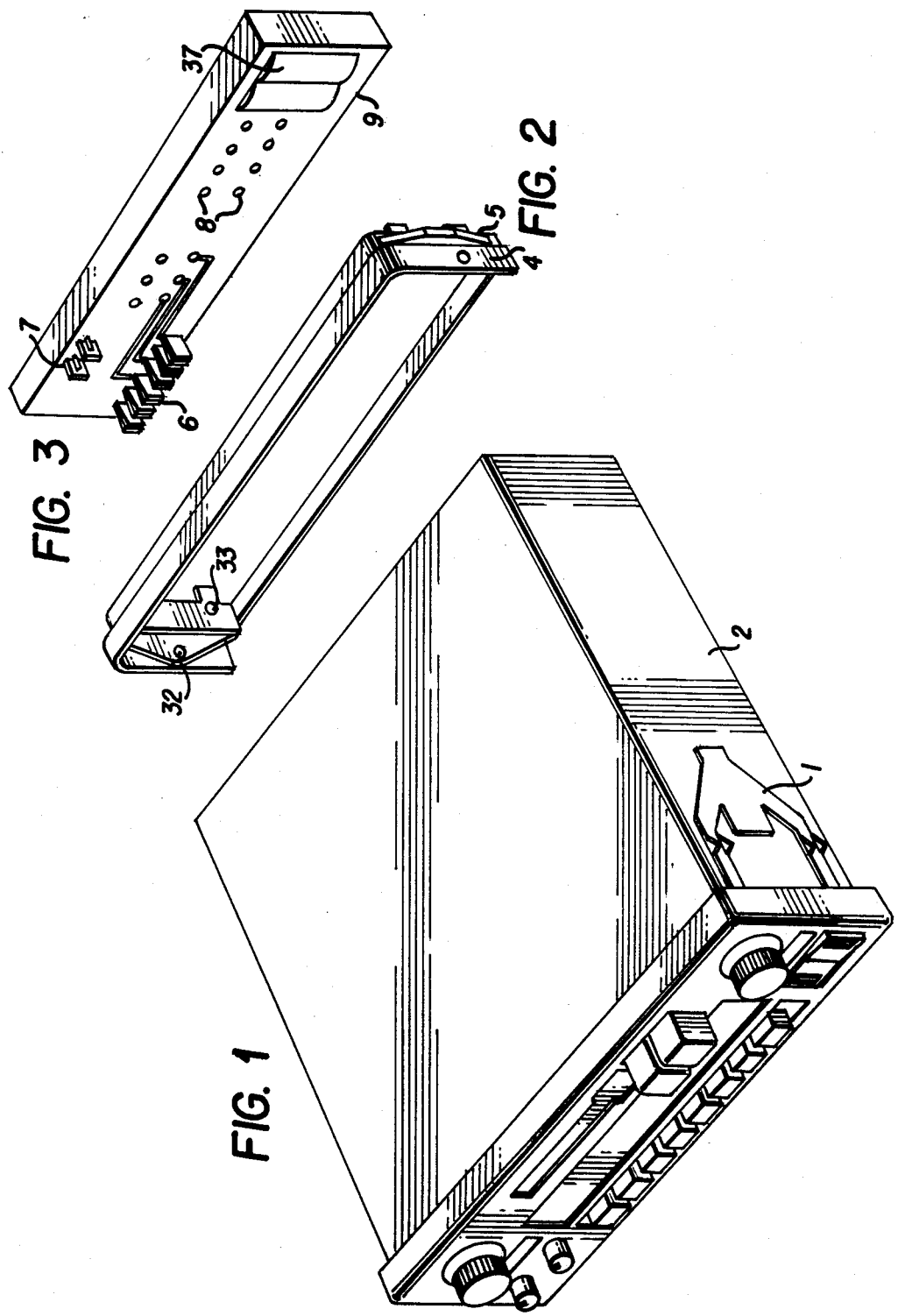

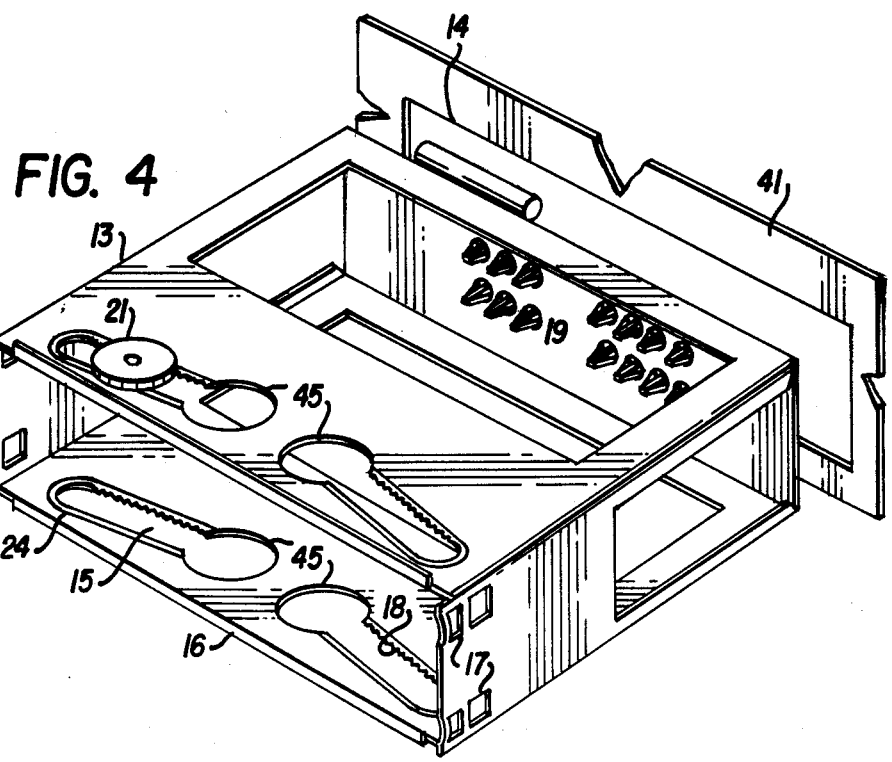
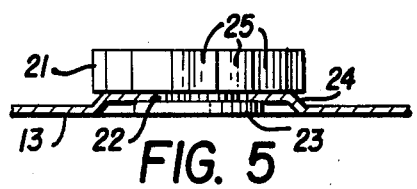
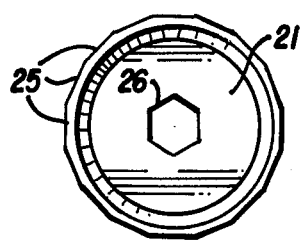
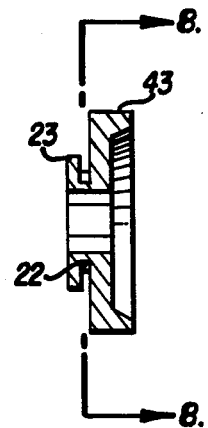
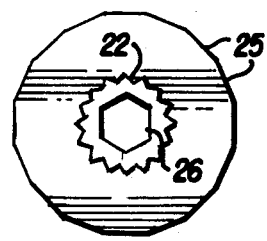

DEVICE FOR INSTALLING AUTOMOBILE RADIOS ON AUTOMOBILE DASH PANELS BY FRONTAL APPLICATION AND WITHOUT THE USE OF SCREWS

German DIN 7550 E/F standards relating to automobile radio installation, which were published some years ago and are used by many manufacturers in Italy, limit the dimensions of fixed support boxes for the automobile radios to 180×53 mm with a depth of 175 mm, and thus define the dimensions of the aperture in the automobile front panel. These standards also disallow fixing the fixed support box by means of frontal screws. In this respect, seats or passage holes for said screws are not provided in the automobile front panel.

The use of frontal screws would thus make it necessary for the installer to form the seats for said screws, leading to considerable time wastage and assembly difficulties.

The object of the present invention is to provide an automobile radio installation device, characterised by a very simple and practical method for locking the automobile radio on insertion into its seat and releasing it for extraction therefrom, and also characterized by a screwless system for fixing the fixed support box.

The aforesaid characteristics represent a substantial improvement over the known prior art which is described for example in preceding patents of the present applicant, namely Italian Patent Application Nos. 29757 A/78 and 20683 A/78, in which the fixing to the automobile front panel required amongst other things the use of screws.

The installation device according to the invention and its operation are described hereinafter with reference to the drawings, which show the essential structural elements in the case of an extractable automobile radio.

FIG. 1 illustrates a radio casing including a locking spring according to the present invention;

FIG. 2 illustrates a frame for fitting to the front part of a radio casing according to the present invention;

FIG. 3 illustrates complementary structure for electrical equipment for securing to the end of the radio casing of FIGS. 1 and 2;

FIG. 4 illustrates a fixed support box for fixing onto an automobile front panel;

FIGS. 5-8 illustrate a construction of a dog for installing the fixed support box illustrated in FIG. 4;

Figure 4B:
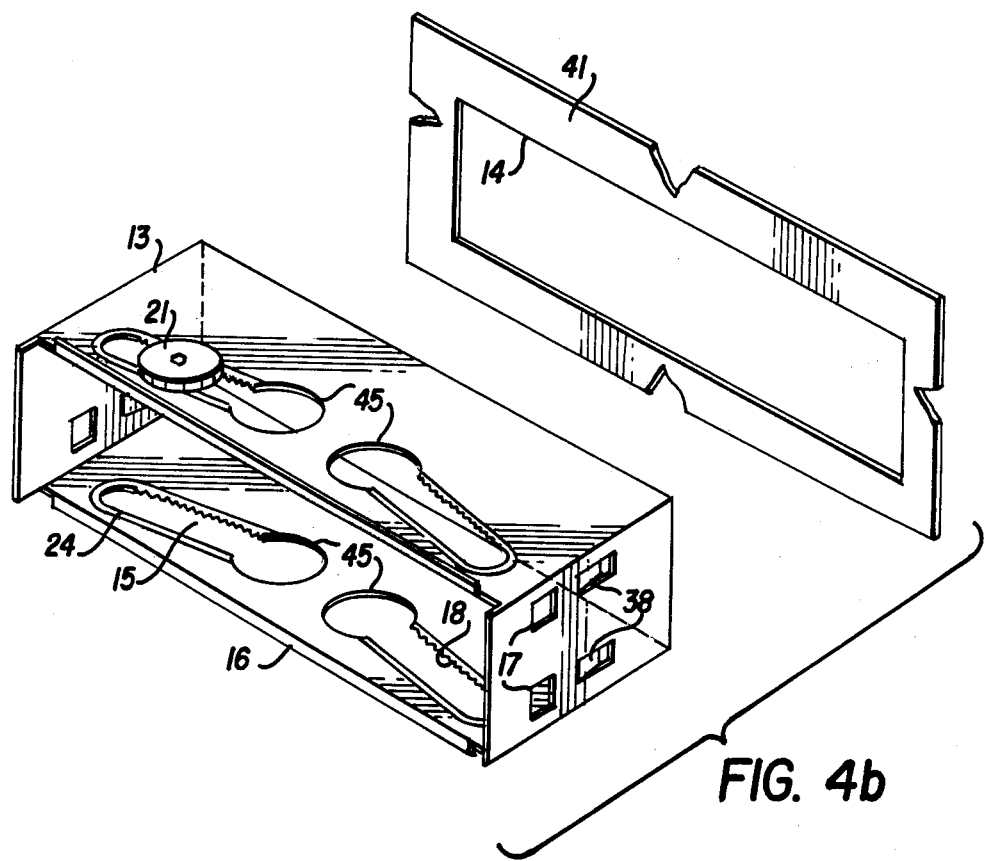
FIG. 4b illustrates an embodiment of an installation device for non-extractable automobile radios according to the present invention.

FIG. 1 is a diagrammatic representation of the extractable automobile radio according to the present invention. The reference numeral 1 indicates the locking spring and 2 the radio casing. A frame, generally of synthetic resin, which is indicated by 5 in FIG. 2 and which incorporates a sheet metal element 3 and a mobile synthetic resin element 30, is fitted to the front part of said casing.

Figure 12:
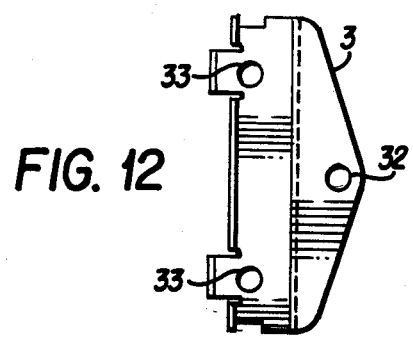
FIG. 12 shows details of sheet metal element 3 shown in FIG. 2.
Figure 13:
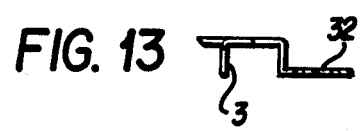
FIG. 13 shows additional details of the sheet metal element 3 of FIG. 2.

The sheet metal element 3, shown in greater detail in FIGS. 12 and 13, has the following functions:

1. it supports the handle 4 which is pivoted on the pivots 32;
2. it supports said frame on the radio casing 2; and
3. it supports the mobile element 30 (both sides).

Figure 9:
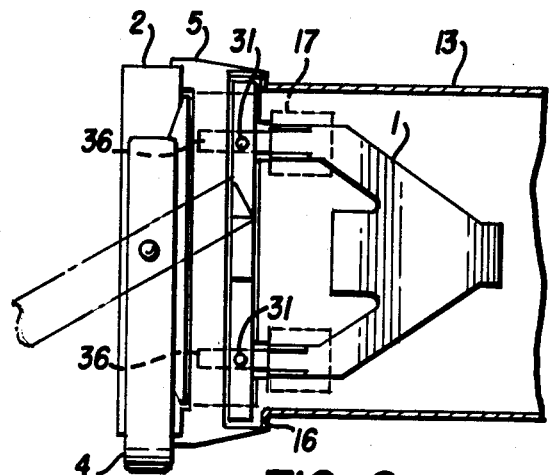
FIG. 9 illustrates an installation procedure for the installation device according to the present invention.
Figure 10:
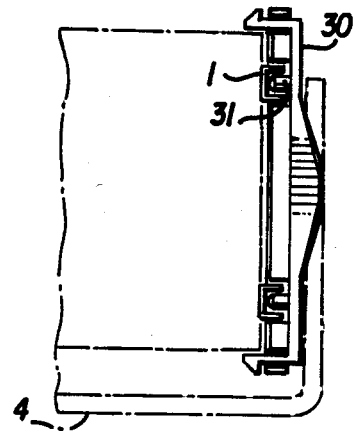
FIG. 10 illustrates structural interrelationship of the mobile element and locking spring according to the present invention.
Figure 14:
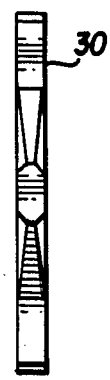
FIG. 14 is a side view of the mobile element associated with the frame illustrated in FIG. 2.
Figure 15:
FIG. 15 is a longitudinal sectional view of the mobile element associated with the frame illustrated in FIG. 2.
Figure 16:
FIG. 16 is a view showing the opposite side of the mobile element to that shown in FIG. 14.
Figure 17:
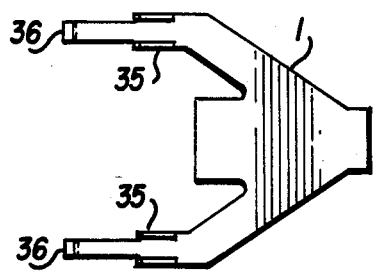
FIG. 17 is a front view of the forked locking spring illustrated in FIG. 1.
Figure 18:
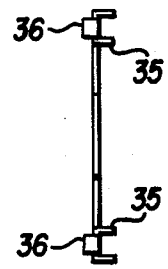
FIG. 18 is a profile view of the forked locking spring illustrated in FIG. 1.
Figure 19:
FIG. 19 is an end view of the forked locking spring illustrated in FIG. 1.

When in its rest position, the handle 4 is parallel to the front side of the automobile radio, i.e. its arms are in an approximately vertical position. When it is gripped for extracting the radio, it assumes a position in which its arms are approximately horizontal. In this manner, that part of the arms which extends beyond the pivots 32 presses against the mobile elements 30 and displaces them inwards. The mobile element 30, shown in longitudinal section in FIG. 15 (see also FIGS. 14 and 16) comprises two small pins 31 which rest on the two arms of the forked spring 1 by passing through the holes 33 in the element 3. The forked spring (see FIGS. 17, 18 and 19) is provided with teeth 35 which become inserted into corresponding cavities 17 (FIGS. 4 and 9) disposed in the fixed support box, to lock the automobile radio in its operational position.

Figure 11:
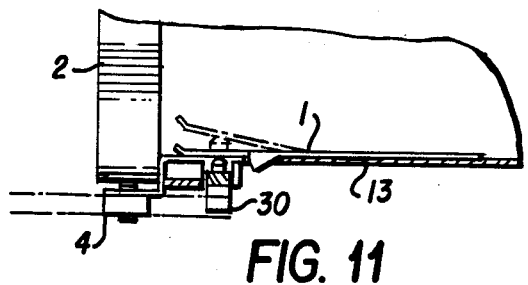
FIG. 11 shows operational details of the installation device of the present invention.

When the mobile element 30 is displaced inwards by operating the handle 4 as heretofore described, the element 30 urges the two arms of the forked spring inwards (see FIG. 11), and consequently, the teeth 35 leave the insertion cavities 17, so releasing the radio, which can then be extracted. In contrast, when the radio 2 is inserted into the fixed support box 13 and the handle 4 is lowered, the mobile element 30 can move outwards together with the forked spring and under the thrust of this latter, to enable the teeth 35 to enter the locking cavities 17.

A further essential aspect of the installation device according to the present invention is the system for fixing the fixed support box onto the automobile front panel 41.

The characteristic structural elements of this box, which is indicated by 13 in FIG. 4, are the apertures 15 provided in the two horizontal major walls of the box. Said apertures are in the shape of a yale key, in which the two parallel sides 24 have their edge raised outwards from the box (see also FIG. 5), one of said sides being provided with saw-toothing 18. Said apertures 15 are disposed in pairs such that their longitudinal axes form a contained angle of between 10° and 50°, and preferably between 15° and 30°.

The fixed box also comprises a rim 16, the purpose of which is to act as a stop ledge, and which, on installation, rests against the outer edge of the aperture 14 provided in the automobile front panel (or dash panel).

As already stated, the fixed box comprises cavities 17 for the insertion of the teeth 35 for locking the automobile radio.

For installing the fixed box, four dogs 21 are used, each to be inserted into the box apertures 15. The structure of the dog, which is constructed in one piece from synthetic resin, is shown in FIGS. 5, 6, 7 and 8. It can be defined as being constituted by a washer 43 of larger diameter, provided on its outer edge with facets 25, and a washer of smaller diameter 23, with a groove or throat 22 therebetween. The base of the throat 22 is provided with toothing of the same pitch as that of the toothing 18 on the aperture 15. The dog is provided with a central hexagonal bore 26.

For its installation, the fixed box is inserted completely into the aperture 14 of the automobile front panel (or dash panel) so that the stop rim 16 rests against the outer edge of the aperture 14. At this point, the four dogs are inserted into the respective circular cavities 45 of the apertures 15 and are then rotated so that the toothing on the throat 22 engages with the toothing 18 of the straight edge. The dog is rotated by means of a hexagonal key inserted into the central bore 26. In this manner, the dog moves along the toothed edge 18 in a direction both towards the sides and towards the front of the box. At a certain point it makes contact by way of its faceted outer edge 25 with the inner wall of the automobile front panel (or dash panel), and presses strongly against it to effectively fix the box to the panel. The edge facets provide a tightening action by means of successive tripping movements, which prevents any slackening due to spontaneous unscrewing of the dog. Obviously, by rotating the dog in the reverse direction the support box can be removed with maximum ease.

It is clear that the operation can be carried out with maximum ease using a simple hexagonal key of the right-angled type, and has the advantage of frontal installation without requiring any manipulation behind the automobile dash panel, and at the same time is effected without screws.

In order to complete the description, FIG. 3 shows a complementary structure for the electrical equipment which comprises the connections 6, 7, the seat for the batteries 37, and sockets 8 for external connections. This structure is fixed to the end of the casing 2 for the extractable automobile radio.

The external connection pins 19 shown in FIG. 4 are inserted into the sockets 8.

The fixed support box according to the invention can also be conveniently used for installing automobile radios of the non-extractable type. In this case, the box is open at its end to allow passage of the electric cables for the fixed connections, and is provided with locking elements 38 (springs or other type) for fixing the radio.

An embodiment of this type for non-extractable automobile radios is shown in FIG. 4b.

The installation device according to the present invention can also be advantageously applied to other appliances such as music cassettes, radiotelephones and the like, having an external structure and overall dimensions similar to those of an automobile radio.

I claim:

1. A device for installing automobile radios, comprising a fixed support box fixed to an automobile front panel by means of four round dogs disposed in apertures in said box, said apertures having toothed edges, and rack means for moving said dogs by rotation along said toothed edges of said apertures until said dogs come into contact with the automobile front panel and exert pressure thereon, said dogs being operated by means of a hexagonal key inserted into a bore in a center of each said dog, said dogs also comprising facets on their outer edge.

2. A device as claimed in claim 1, wherein said apertures are disposed in pairs such that their longitudinal axes form a contained angle of 10° and 50°.

3. A device as claimed in claim 1, wherein edges of straight portions of said apertures are raised outwards from the fixed support box.

4. A device as claimed in claim 1, wherein said device is for installing an extractable automobile radio having a casing with a frame comprising a sheet metal element, a mobile element and a handle pivotably attached to the sheet metal element, said device further comprising at least one locking tooth which is connected to a spring attached to said casing, and means for disengaging said tooth from corresponding cavities in the fixed support box when said handle is moved into a substantially horizontal position, whereby the automobile radio can be extracted.

5. An automobile radio installation system comprising a fixed support box having at least one outwardly projecting rim on each of an upper and lower horizontal surface thereof, said support box for insertion into a panel aperture in an automobile front panel with said rims abutting against an edge of said panel aperture, at least two pairs of round dogs for attaching said box to said automobile front panel, said upper and lower horizontal surfaces of said box including first and second pairs of elongated apertures respectively, each dog being disposed in one said elongated aperture, each said aperture having a toothed elongated portion and an enlarged end portion through which a said dog may be inserted, each said toothed elongated portion for engaging teeth on an outer edge of a said dog, such that rotation of said dogs within said apertures causes said toothed edges of said apertures and said teeth of said dogs to engage and to move said dogs along said apertures until said dogs contact said front panel to urge said front panel against said rims.

6. A system as recited in claim 5 wherein each said dog includes a central hexagonal bore for receiving a hexagonal key for rotation of said dog.

7. A system as recited in claim 5 further comprising a radio casing comprising a locking spring having a projecting tooth for engaging a side aperture in said support box to secure said casing within said support box and a handle pivotably connected to a laterally mobile member, both said handle and said mobile member being attached to said radio casing, said handle and said mobile member cooperating to disengage said tooth from said side aperture upon rotation of said handle relative to said mobile member to release said casing from said box.

8. A system for installing automobile radios in an automobile front panel comprising:
(a) a support box having first and second pairs of elongated apertures on upper and lower horizontal surfaces of said support box, each said elongated aperture having an enlarged end portion and having a toothed elongated portion, said support box having an outwardly projecting rim on an end of each of said upper and lower horizontal surfaces, said rims for abutting against an edge of a panel aperture in said automobile front panel when said support box has been inserted into said front panel, said elongated portions of said apertures being angled relative to a said rim on a same surface of said support box, said support box having at least one side aperture on a side thereof;

(b) a plurality of dogs each for insertion into a said elongated aperture after said support box has been inserted into said panel aperture with said rims abutting an edge of said panel aperture, each dog having dimensions small enough to fit into an enlarged end portion of a said elongated aperture, each dog having teeth for engaging with a said toothed elongated portion of a said elongated aperture, whereby during rotation of each dog it will move in a direction toward a rim of said support box unitl an outer edge of said dog contacts and presses said automobile front panel against a said rim to secure said support box against said automobile front panel; and (c) a radio casing having at least one locking spring disposed on a side thereof, said spring having a laterally projecting tooth, said radio casing for fitting into an interior of said support box, said tooth for engaging said side aperture of said support box to secure said radio casing within said support box.

9. The system as recited in claim 8 further comprising a releasing frame fitted to a front portion of said radio casing for disengaging said tooth from said side aperture, said frame having a mobile member attached thereto for lateral movement relative to said radio casing and a handle pivotably attached to said frame for pivoting movement relative to said mobile member, said mobile member having at least one projecting portion which rests against said locking spring and an engaging portion for engaging with said handle, said handle having an end portion for pressing against said engaging portion of said mobile member when said handle is rotated to move said mobile member and said locking spring away from said side aperture until said tooth of said locking spring disengages from said side aperture of said support box whereby said radio casing can be withdrawn from said support box.

* * * * *